J. GROSSIUS & D. J. MULLANEY.
Broiler.
No. 131,057.
Patented Sep. 3, 1872.
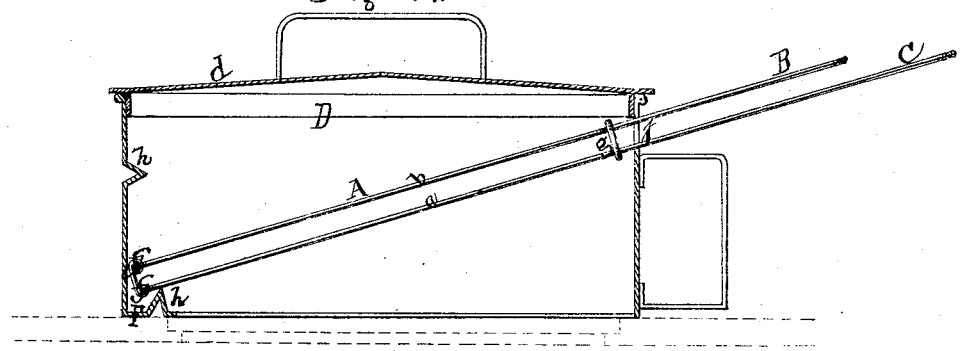
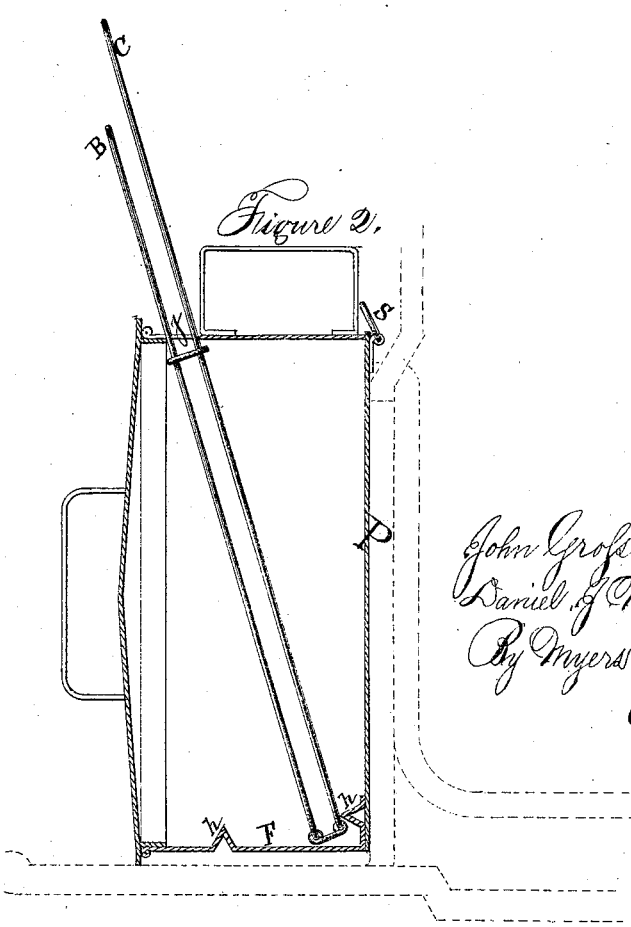

UNITED STATES PATENT OFFICE.

JOHN GROSSIUS AND DANIEL J. MULLANEY, OF CINCINNATI, OHIO.

IMPROVEMENT IN BROILERS.

Specification forming part of Letters Patent No. 131,057, dated September 3, 1872.

SPECIFICATION.

We, JOHN GROSSIUS and DANIEL J. MULLANEY, of Cincinnati, Hamilton county, in the State of Ohio, have invented certain Improvements in Broilers, of which the following is a specification:

*Description of the Accompanying Drawing.*

Figure 1 is a sectional view of my device, showing the arrangement of its parts. Fig. 2 is a sectional elevation of the same.

My invention consists of the broiler A with hinges $f$ and loop $g$, in combination and arrangement, substantially, with the holder D, with recess F.

A is a broiler, which is made preferably of wire, and comprises the parts $a$ and $b$, which are hinged together at $f$. B and C are handles of said broiler, the nether one, C, being the longest and projecting a distance slightly greater from the broiler than handle B. $g$ is a metallic loop or slide, which is slid over the handles of the broiler, and thus secures together the parts $a$ and $b$. The holder D has rigidly attached thereto in the interior thereof the pieces $h$, which together form a recess for the reception of the juices or gravy which obtain in the process of broiling. Said holder is also provided with the lid $d$, and slots are formed at $j$ for the reception of the handles of the broiler.

The operation is as follows: The broiler is opened and the meat placed between the wires $a$ and $b$, and the loop $g$ is then slid down on the handles, whereupon the lid $d$ of the holder (which lid serves to radiate the heat) is closed down and securely fastened by a button or catch. The holder D and contents can then (in the process of cooking) be placed over a stove or coals, as shown in Fig. 1, or in front of a grate-fire, as shown in Fig. 2. The recess provided at F will then receive the juices and gravy generated in the process of cooking, and the usual loss thereof is thus prevented.

In broiling meats before a grate-fire, as shown in Fig. 2, we employ a slide or fender, P, with handle S for preventing the meat from becoming smoked, and also as a protection against falling cinders.

Claim.

The combination and arrangement of holder D, provided with lid $d$, and recess F with broiler A, substantially as shown and described.

JOHN GROSSIUS.
DANIEL J. MULLANEY.

Witnesses:
A. THEUR RANT,
JOHN WM. DOLLMAN.